US007872995B2

(12) United States Patent
Fujii et al.

(10) Patent No.: US 7,872,995 B2
(45) Date of Patent: Jan. 18, 2011

(54) COMMUNICATION SYSTEM, COMMUNICATION DEVICE, NOTIFICATION METHOD, RECORDING MEDIUM, AND PROGRAM

(75) Inventors: Kunihide Fujii, Tokyo (JP); Kazuyuki Sakamoto, Chiba (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 11/518,170

(22) Filed: Sep. 11, 2006

(65) Prior Publication Data

US 2007/0171848 A1 Jul. 26, 2007

(30) Foreign Application Priority Data

Sep. 12, 2005 (JP) ............................. 2005-263969

(51) Int. Cl.
*H04B 7/00* (2006.01)
(52) U.S. Cl. ...................... 370/310; 235/451; 455/41.1
(58) Field of Classification Search .................. 370/310
See application file for complete search history.

(56) References Cited

U.S. PATENT DOCUMENTS

| 5,802,469 | A * | 9/1998 | Nounin et al. ............ 455/422.1 |
| 6,732,177 | B1 * | 5/2004 | Roy ............................ 709/227 |
| 2002/0107798 | A1 | 8/2002 | Hameau et al. |
| 2002/0131453 | A1 * | 9/2002 | Amtmann ................... 370/498 |
| 2002/0181415 | A1 * | 12/2002 | West et al. .................. 370/312 |
| 2003/0223352 | A1 * | 12/2003 | Williams .................... 370/201 |
| 2003/0235169 | A1 * | 12/2003 | Pandey et al. ............... 370/338 |
| 2004/0030791 | A1 * | 2/2004 | Dorenbosch et al. ........ 709/230 |
| 2004/0131014 | A1 * | 7/2004 | Thompson et al. .......... 370/230 |
| 2004/0132407 | A1 * | 7/2004 | Hein-Magnussen et al. ...... 455/41.1 |
| 2004/0174847 | A1 * | 9/2004 | Menon et al. ............... 370/328 |
| 2005/0077356 | A1 * | 4/2005 | Takayama et al. ........... 235/451 |
| 2006/0044153 | A1 * | 3/2006 | Dawidowsky .......... 340/825.22 |

FOREIGN PATENT DOCUMENTS

EP 0422230 A1 4/1991

(Continued)

OTHER PUBLICATIONS

Singapore Search report dated Dec. 28, 2007 for corresponding Singapore Patent Application No. 2006-06153-5.

(Continued)

*Primary Examiner*—Phuoc Doan
(74) *Attorney, Agent, or Firm*—Rader, Fishman & Grauer PLLC

(57) ABSTRACT

A communication system includes first and second communication devices that carry out wireless communication. The first communication device includes a setter configured to set a first indication mode and a corresponding second indication mode, a sender configured to send data representing the second indication mode to the second communication device when communication has been established with the second communication device, and a first indicator configured to indicate the establishment of communication in the first indication mode, correspondingly to indication in the second indication mode by the second communication device. The second communication device includes a receiver configured to receive the data representing the second indication mode, and a second indicator configured to indicate the establishment of communication in the second indication mode, correspondingly to the indication in the first indication mode by the first communication device.

15 Claims, 8 Drawing Sheets

FOREIGN PATENT DOCUMENTS

| | | |
|---|---|---|
| JP | 63-276167 A | 11/1988 |
| JP | 64-010456 U | 1/1989 |
| JP | 2001-175602 A | 6/2001 |
| JP | 2003-317042 A | 11/2003 |
| JP | 2004-215255 A | 7/2004 |
| JP | 2004-228800 A | 8/2004 |
| JP | 2005-071213 | 3/2005 |
| WO | WO-03/038629 A1 | 5/2003 |
| WO | WO-2004/056005 A1 | 7/2004 |

OTHER PUBLICATIONS

Japanese Office Action issued Jan. 21, 2010 for corresponding Japanese Application No. 2005-263969.

Matsue, "Short Distance Wireless Communication Technology NFC Which Expanded the FeliCa Technology Standard" Computer & Networklan, Japan, Ohmsha Co., Ltd., Jan. 1, 2005, vol. 23, No. 1, pp. 15 to 21, Application Construction Guide using FeliCa.

* cited by examiner

COMMUNICATION SYSTEM, COMMUNICATION DEVICE, NOTIFICATION METHOD, RECORDING MEDIUM, AND PROGRAM

CROSS REFERENCES TO RELATED APPLICATIONS

The present invention contains subject matter related to Japanese Patent Application JP 2005-263969 filed in the Japanese Patent Office on Sep. 12, 2005, the entire contents of which are incorporated herein by reference.

BACKGROUND OF THE INVENTION

1. Field of the Invention

The present invention relates to communication systems, communication devices, notification methods, recording media, and programs. More specifically, the present invention relates to a communication system, communication device, notification method, recording medium, and program with which a counterparty of communication can be readily identified.

2. Description of the Related Art

Recently, services employing short-range communication, such as commutation tickets, prepaid cards, electronic money, and ID cards, are becoming common. An example of short-range communication standard is NFC (Near Field Communication, ISO/IEC 18092). A feature of short-range communication is that the distance between communication devices involved is short, so that by placing a communication device in proximity to a different communication device, it is possible to determine a counterparty of communication and to start communication. Short-range communication is described, for example, in Japanese Unexamined Patent Application Publication No. 2004-215255.

SUMMARY OF THE INVENTION

In short-range communication, although it is possible to start communication simply by placing a communication device to a different communication device, for example, when a plurality of communication devices as candidate counterparties of communication exist in the proximity, it is difficult to select a specific counterparty of communication and to confirm a counterparty with which a communication path has been established. Furthermore, recent user interfaces demand that a counterparty of communication be selected on the basis of the presence in the proximity and processing for selecting a counterparty of communication using device-specific information (e.g., an ID or name) be omitted. Thus, even if technologies that allow secure exchange of data with counterparties of communication, such as various types of communication keys, spoofing of a party in connection could occur so that data could be read or written by an unintended third party.

It is desired that a counterparty of communication be readily identified.

A communication system according to a first embodiment of the present invention is a communication system including a first communication device configured to carry out wireless communication; and a second communication device configured to carry out wireless communication. The first communication device includes setting means for setting a first indication mode and a second indication mode corresponding to the first indication mode, sending means for sending data representing the second indication mode to the second communication device when communication has been established with the second communication device, and first indicating means for indicating the establishment of communication between the first communication device and the second communication device in the first indication mode, correspondingly to indication of the establishment of communication in the second indication mode by the second communication device. The second communication device includes receiving means for receiving the data representing the second indication mode, the data having been sent from the first communication device, and second indicating means for indicating the establishment of communication between the first communication device and the second communication device in the second indication mode, correspondingly to the indication of the establishment of communication in the first indication mode by the first communication device.

A notification method according to the first embodiment of the present invention is a notification method in a communication system including a first communication device and a second communication device that carry out wireless communication. The notification method includes the steps of setting, by the first communication device, a first indication mode and a second indication mode corresponding to the first indication mode; sending, by the first communication device, data representing the second indication mode to the second communication device when communication has been established with the second communication device; indicating, by the first communication device, the establishment of communication between the first communication device and the second communication device in the first indication mode, correspondingly to indication of the establishment of communication in the second indication mode by the second communication device; receiving, by the second communication device, the data representing the second indication mode, the data having been sent from the first communication device; and indicating, by the second communication device, the establishment of communication between the first communication device and the second communication device in the second indication mode, correspondingly to the indication of the establishment of communication in the first indication mode by the first communication device.

A communication device according to a second embodiment of the present invention is a communication device that carries out wireless communication with a different communication device. The communication device includes setting means for setting a first indication mode and a second indication mode corresponding to the first indication mode; communication means for sending data representing the second indication mode to the different communication device when communication has been established with the different communication device; and indicating means for indicating the establishment of communication between the own communication device and the different communication device in the first indication mode, correspondingly to indication of the establishment of communication in the second indication mode by the different communication device.

The setting means may set the first indication mode and the second indication mode using a random number.

The communication device may further include key exchanging means for securely exchanging a communication key with the different communication device so that the communication means sends the data representing the second indication mode to the different communication device after completion of the exchange of the communication key, the data being sent in an encrypted form using the communication key.

The communication means may further send first identification information identifying the own communication device to the different communication device and receive second identification information identifying the different communication device so that the indicating means can further indicate the second identification information correspondingly to indication of the first identification information by the different communication device.

The communication means may continue or stop the communication with the different communication device according to an instruction input by a user after the different communication device with which the own communication device has established communication has been identified, on the basis of the indication by the indicating means and the indication by the different communication device.

The communication means may carry out short-range communication in which communication with the different communication device is started when the different communication device is placed in a proximity of the own communication device.

The indicating means may include a display that indicates the establishment of communication between the own communication device and the different communication device by displaying an image or text that is the same as or that corresponds to an image or text displayed by the different communication device.

The indication means may include a light emitting device that indicates the establishment of communication between the own communication device and the different communication device by emitting light with a color that is the same as or that corresponds to a color of light emitted by the different communication device, or by blinking by a cycle that is the same or that corresponds to a cycle of blinking of the different communication device.

The indicating means may include an audio output device that indicates the establishment of communication between the own communication device and the different communication device by outputting a sound that is the same or that corresponds to a sound output by the different communication device.

A notification method or a program according to the second embodiment of the present invention is a notification method of a communication device that carries out wireless communication with a different communication device or a program for allowing a computer of a communication device that carries out wireless communication with a different communication device to execute processing. The notification method or the processing includes the steps of setting a first indication mode and a second indication mode corresponding to the first indication mode; controlling sending of data representing the second indication mode to the different communication device when communication has been established with the different communication device; and indicating the establishment of communication between the own communication device and the different communication device in the first indication mode, correspondingly to indication of the establishment of communication in the second indication mode by the different communication device.

A communication device according to a third embodiment of the present invention is a communication device that carries out wireless communication with a different communication device. The communication device includes communication means for receiving data representing a second indication mode corresponding to a first indication mode from the different communication device; and indicating means for indicating establishment of communication between the own communication device and the different communication device in the second indication mode, correspondingly to indication of the establishment of communication in the fist indication mode by the different communication device.

The communication means may further send first identification information identifying the own communication device to the different communication device and receive second identification information identifying the different communication device so that the indicating means can further indicate the second identification information correspondingly to indication of the first identification information by the different communication device.

A notification method or a program according to the third embodiment of the present invention is a notification method of a communication device that carries out wireless communication with a different communication device or a program for allowing a computer of a communication device that carries out wireless communication with a different communication device to execute processing. The notification method or the processing includes the steps of controlling reception of data representing a second indication mode corresponding to a first indication mode, the data having been sent from the different communication device; and indicating establishment of communication between the own communication device and the different communication device in the second indication mode, correspondingly to indication of the establishment of communication in the first indication mode by the different communication device.

According to the first embodiment of the present invention, the first communication device sets a first indication mode and a second indication mode corresponding to the first indication mode, sends data representing the second indication mode to the second communication device when communication has been established with the second communication device, and indicates the establishment of communication between the first communication device and the second communication device in the first indication mode, correspondingly to indication of the establishment of communication in the second indication mode by the second communication device. The second communication device receives the data representing the second indication mode, the data having been sent from the first communication device, and indicates the establishment of communication between the first communication device and the second communication device in the second indication mode, correspondingly to the indication of the establishment of communication in the first indication mode by the first communication device.

According to the second embodiment of the present invention, a first indication mode and a second indication mode corresponding to the first indication mode are set, sending of data representing the second indication mode to the different communication device is controlled when communication has been established with the different communication device, and the establishment of communication between the own communication device and the different communication device is indicated in the first indication mode, correspondingly to indication of the establishment of communication in the second indication mode by the different communication device.

According to the third embodiment of the present invention, reception of data representing a second indication mode corresponding to a first indication mode is controlled, the data having been sent from the different communication device, and the establishment of communication between the own communication device and the different communication device is indicated in the second indication mode, correspondingly to indication of the establishment of communication in the first indication mode by the different communication device.

As described above, according to the first to third embodiments of the present invention, it is possible to recognize that communication with a different communication device has been established. Furthermore, according to the first to third embodiments of the present invention, it is possible to readily identify a counterparty of communication, so that secure communication can be carried out readily and reliably.

Figure 1:
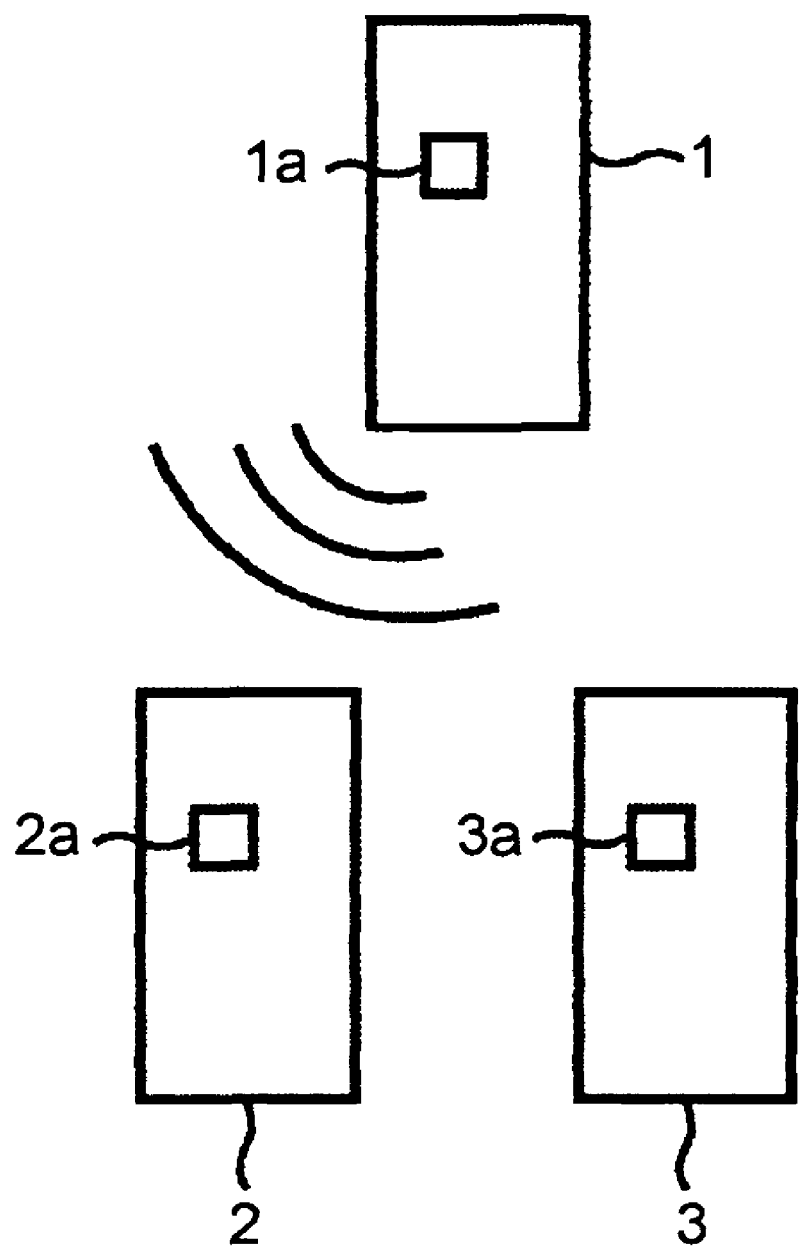
FIG. 1 is a block diagram of a communication system according to an embodiment of the present invention.

DESCRIPTION OF THE PREFERRED
EMBODIMENTS

Before describing embodiments of the present invention, examples of correspondence between the features of the present invention and embodiments described in the specification and shown in the drawings will be described below. This description is intended to assure that embodiments supporting the present invention are described in this specification. Thus, even if a certain embodiment is not described herein as corresponding to certain features of the present invention, that does not necessarily mean that the embodiment does not correspond to those features. Conversely, even if an embodiment is described herein as corresponding to certain features, that does not necessarily mean that the embodiment does not correspond to other features.

A communication system according to a first embodiment of the present invention is a communication system including a first communication device (e.g., one of NFC communication devices 1 to 3 shown in FIG. 1, acting as an initiator) configured to carry out wireless communication; and a second communication device (e.g., one of the NFC communication devices 1 to 3 shown in FIG. 1, acting as a target) configured to carry out wireless communication. The first communication device includes setting means (e.g., an indication-mode setter 32 shown in FIG. 3) for setting a first indication mode and a second indication mode corresponding to the first indication mode, sending means (e.g., a short-range communication unit 12 shown in FIG. 2) for sending data representing the second indication mode to the second communication device when communication has been established with the second communication device, and first indicating means (e.g., an indicator 15 shown in FIG. 2) for indicating the establishment of communication between the first communication device and the second communication device in the first indication mode, correspondingly to indication of the establishment of communication in the second indication mode by the second communication device. The second communication device includes receiving means (e.g., a short-range communication unit 12 shown in FIG. 2) for receiving the data representing the second indication mode, the data having been sent from the first communication device, and second indicating means (e.g., an indicator 15 shown in FIG. 2) for indicating the establishment of communication between the first communication device and the second communication device in the second indication mode, correspondingly to the indication of the establishment of communication in the first indication mode by the first communication device.

A notification method according to the first embodiment of the present invention is a notification method in a communication system including a first communication device (e.g., one of NFC communication devices 1 to 3 shown in FIG. 1, acting as an initiator) and a second communication device (e.g., one of the NFC communication devices 1 to 3 shown in FIG. 1, acting as a target) that carry out wireless communication. The notification method includes the steps of setting (e.g., step S7 shown in FIG. 4), by the first communication device, a first indication mode and a second indication mode corresponding to the first indication mode; sending (;e.g., step S8 shown in FIG. 4), by the first communication device, data representing the second indication mode to the second communication device when communication has been established with the second communication device; indicating (e.g., step S9 shown in FIG. 4), by the first communication device, the establishment of communication between the first communication device and the second communication device in the first indication mode, correspondingly to indication of the establishment of communication in the second indication mode by the second communication device; receiving (e.g., step S27 shown in FIG. 6), by the second communication device, the data representing the second indication mode, the data having been sent from the first communication device; and indicating (e.g., step S28 shown in FIG. 6), by the second communication device, the establishment of communication between the first communication device and the second communication device in the second indication mode, correspondingly to the indication of the establishment of communication in the first indication mode by the first communication device.

A communication device (e.g., one of NFC communication devices 1 to 3 shown in FIG. 1, acting as an initiator) according to a second embodiment of the present invention is a communication device that carries out wireless communication with a different communication device (e.g., one of the NFC communication devices 1 to 3 shown in FIG. 1, acting as a target). The communication device includes setting means (e.g., an indication-mode setter 32 shown in FIG. 3) for setting a first indication mode and a second indication mode corresponding to the first indication mode; communication means (e.g., a short-range communication unit 12 shown in FIG. 2) for sending data representing the second indication mode to the different communication device when communication has been established with the different communication device; and indicating means (e.g., an indicator 15 shown in FIG. 2) for indicating the establishment of communication between the own communication device and the different communication device in the first indication mode, correspondingly to indication of the establishment of communication in the second indication mode by the different communication device.

Figure 3:
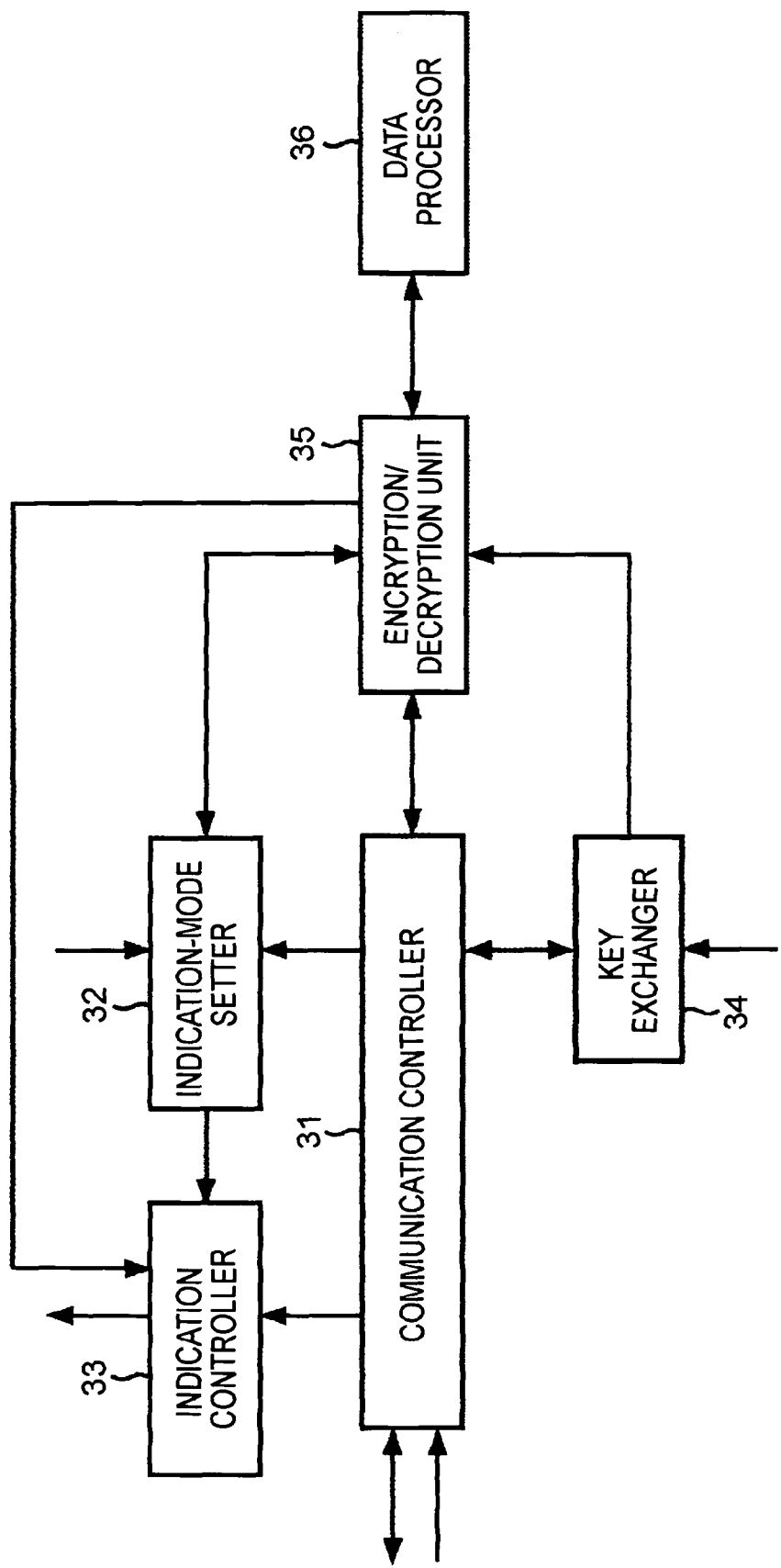
FIG. 3 is a block diagram showing the example of the configuration of functions achieved by a controller shown in FIG. 2.

The communication device according to the second embodiment of the present invention may further include key exchanging means (e.g., a key exchanger 34 shown in FIG. 3)

for securely exchanging a communication key with the different communication device so that the communication means sends the data representing the second indication mode to the different communication device after completion of the exchange of the communication key, the data being sent in an encrypted form using the communication key.

A notification method or a program according to the second embodiment of the present invention is a notification method of a communication device (e.g., one of NFC communication devices 1 to 3 shown in FIG. 1, acting as an initiator) that carries out wireless communication with a different communication device (e.g., one of the NFC communication devices 1 to 3 shown in FIG. 1, acting as a target) or a program for allowing a computer of a communication device (e.g., one of NFC communication devices 1 to 3 shown in FIG. 1, acting as an initiator) that carries out wireless communication with a different communication device (e.g., one of the NFC communication devices 1 to 3 shown in FIG. 1, acting as a target) to execute processing. The notification method or the processing includes the steps of setting (e.g., step S7 shown in FIG. 4) a first indication mode and a second indication mode corresponding to the first indication mode; controlling (e.g., step S8 shown in FIG. 4) sending of data representing the second indication mode to the different communication device when communication has been established with the different communication device; and indicating (e.g., step S9 shown in FIG. 4) the establishment of communication between the own communication device and the different communication device in the first indication mode, correspondingly to indication of the establishment of communication in the second indication mode by the different communication device.

A communication device (e.g., one of NFC communication devices 1 to 3 shown in FIG. 1, acting as a target) according to a third embodiment of the present invention is a communication device that carries out wireless communication with a different communication device (e.g., one of the NFC communication devices 1 to 3 shown in FIG. 1, acting as an initiator). The communication device includes communication means (e.g., a short-range communication unit 12 shown in FIG. 2) for receiving data representing a second indication mode corresponding to a first indication mode from the different communication device; and indicating means (e.g., an indicator 15 shown in FIG. 2) for indicating establishment of communication between the own communication device and the different communication device in the second indication mode, correspondingly to indication of the establishment of communication in the fist indication mode by the different communication device.

A notification method or a program according to the third embodiment of the present invention is a notification method of a communication device (e.g., one of NFC communication devices 1 to 3 shown in FIG. 1, acting as a target) that carries out wireless communication with a different communication device (e.g., one of the NFC communication devices 1 to 3 shown in FIG. 1, acting as an initiator) or a program for allowing a computer of a communication device (e.g., one of NFC communication devices 1 to 3 shown in FIG. 1, acting as a target) that carries out wireless communication with a different communication device (e.g., one of the NFC communication devices 1 to 3 shown in FIG. 1, acting as an initiator) to execute processing. The notification method or the processing includes the steps of controlling (e.g., step S27 shown in FIG. 6) reception of data representing a second indication mode corresponding to a first indication mode, the data having been sent from the different communication device; and indicating (e.g., step S28 shown in FIG. 6) establishment of communication between the own communication device and the different communication device in the second indication mode, correspondingly to indication of the establishment of communication in the first indication mode by the different communication device.

Now, embodiments of the present invention will be described with reference to the drawings.

FIG. 1 shows an example of the configuration of a communication system (a system herein refers to a logical combination of a plurality of devices, regardless of whether the constituent devices are disposed within the same case) according to an embodiment of the present invention.

Referring to FIG. 1, the communication system includes three NFC communication devices 1 to 3. Each of the NFC communication devices 1 to 3 is configured to be capable of carrying out NFC (Near Field Communication) with other NFC communication devices by electromagnetic induction using carrier waves of a single frequency.

The frequency of the carrier waves used by the NFC communication devices 1 to 3 is, for example, 13.56 MHz in the ISM (Industrial Scientific Medical) band. Near Field Communication refers to communication that is allowed between communication devices within a mutual distance of approximately 10 cm, and includes communication that is carried out between communication devices (cases thereof) in contact with each other.

The communication system shown in FIG. 1 may be an IC card system in which one or more of the NFC communication devices 1 to 3 are reader/writers and the other or others are IC cards. Alternatively, in the communication system, each of the NFC communication devices 1 to 3 may be, for example, a personal digital assistant (PDA), a personal computer (PC), a cellular phone, a watch, or a pen. That is, each of the NFC communication devices 1 to 3 is a device that carries out NFC, and is not limited to an IC card or reader/writer in an IC card system.

Each of the NFC communication devices 1 to 3 is capable of carrying out communication in two communication modes, and is also capable of transmitting data at a plurality of transmission rates.

The two communication modes are referred to as a passive mode and an active mode. Now, considering communication carried out between the NFC communication devices 1 and 2, in the passive mode, similarly to an IC card systems of a type that has hitherto been used, one of the NFC communication devices 1 and 2, e.g., the NFC communication device 1, modulates an electromagnetic wave generated by itself (a carrier wave corresponding thereto) to send data to the other NFC communication device, i.e., the NFC communication device 2 in this case, and the NFC communication device 2 load-modulates the electromagnetic wave (a carrier wave corresponding thereto) generated by the NFC communication device 1 to send data to the NFC communication device 1.

In contrast, in the active mode, the NFC communication devices 1 and 2 both send data by modulating electromagnetic waves generated by themselves (carrier waves corresponding thereto).

In NFC carried out by electromagnetic induction, a device that first outputs an electromagnetic wave to start communication, i.e., a device that takes the initiative of communication, is referred to as an initiator. The initiator sends a command to a counterparty of communication, and the counterparty of communication returns a response to the command, whereby NFC is carried out. The counterparty of communication that returns the response to the command from the initiator is referred to as a target.

For example, when the NFC communication device 1 starts outputting an electromagnetic wave to start communication with the NFC communication device 2, the NFC communication device 1 acts as the initiator and the NFC communication device 2 acts as the target.

In the passive mode, the NFC communication device 1 acting as the initiator continues outputting an electromagnetic wave and modules the electromagnetic wave it is outputting to send data to the NFC communication device 2 acting as the target, and the NFC communication device 2 load-modulates the electromagnetic wave being output by the NFC communication device 1 acting as the initiator to send data to the NFC communication device 1.

In contrast, in the active mode, the NFC communication device 1 acting as the initiator starts outputting an electromagnetic wave by itself and modulates the electromagnetic wave to send data to the NFC communication device 2 acting as the target. When the NFC communication device 1 has finished sending data, the NFC communication device 1 stops outputting the electromagnetic wave. Also, the NFC communication device 2 acting as the target starts outputting an electromagnetic wave by itself and modulates the electromagnetic wave to send data to the NFC communication device 1 acting as the initiator. When the NFC communication device 2 has finished sending data, the NFC communication device 2 stops outputting the electromagnetic wave.

The NFC communication devices 1, 2, and 3 include indicators 1a, 2a, and 3a, respectively. The indicators 1a, 2a, and 3a are modules for indicating that a secure communication path has been established with a different NFC communication device. For example, the indicators 1a, 2a, and 3a can be constructed using light emitting devices, such as light emitting diodes (LEDs) or lamps, display devices, such as liquid crystal displays (LCDs), audio output devices, such as alarms or speakers, vibrating devices, such as vibrators, or devices movable by actuators or the like. As will be described later, for example, when a secure communication path has been established between the NFC communication device 1 and the NFC communication device 2, the indicator 1a of the NFC communication device 1 and the indicator 2a of the NFC communication device 2 indicate the establishment of the secure communication path between the NFC communication device 1 and the NFC communication device 2 in their respective indication modes.

Although the communication system shown in FIG. 1 is constituted by the three NFC communication devices 1 to 3, the number of NFC communication devices constituting a communication system is not limited to 3, and may be two or four or more. Furthermore, a communication system may include, for example, IC cards or reader/writers of an IC card system of a type that has hitherto been used, as well as NFC communication devices.

Figure 2:
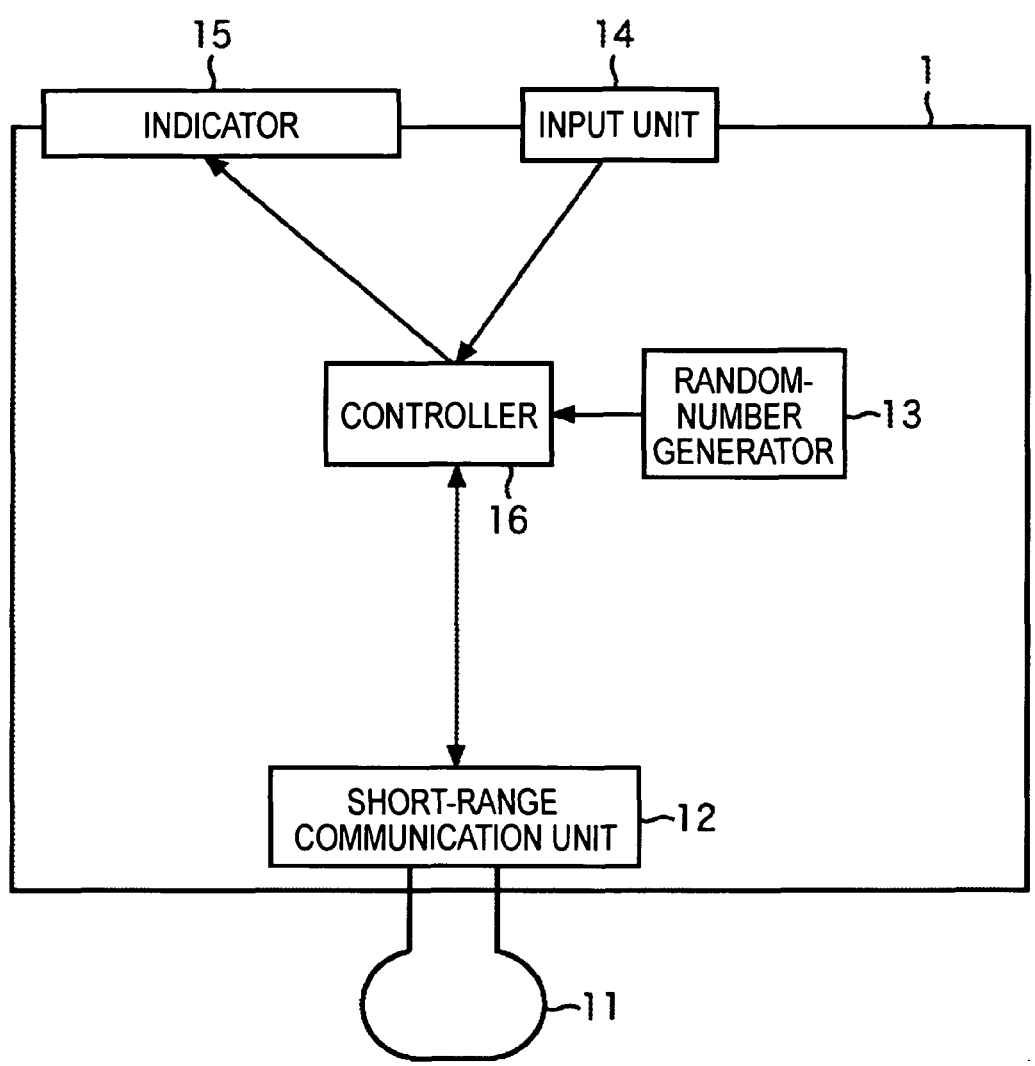
FIG. 2 is a block diagram showing an example of the configuration of an NFC communication device shown in FIG. 1.

FIG. 2 shows an example of the configuration of the NFC communication device 1 shown in FIG. 1. The configurations of the other NFC communication devices 2 and 3 shown in FIG. 1 are the same as the configuration of the NFC communication device 1 shown in FIG. 2, so that descriptions thereof will be omitted.

The NFC communication device 1 includes an antenna 11, a short-range communication unit 12, a random-number generator 13, an input unit 14, an indicator 15, and a controller 16. The indicator 15 is the same as the indicator 1a shown in FIG. 1, with the reference numeral reassigned for simplicity of description.

The antenna 11 forms a closed-loop coil, and it outputs electromagnetic waves in accordance wit change in the amount of current that flows through the coil. A current flows through the antenna 11 when the magnetic flux passing through the coil serving as the antenna 11 changes.

The short-range communication unit 12 receives the current that flows through the antenna 11, carries out tuning and detection, and demodulates signals obtained by detection. The short-range communication unit 12 decodes the demodulated signals, which are in the form of, for example, Manchester codes, and supplies the decoded data corresponding to data transmitted from a different NFC communication device (hereinafter also referred to as reception data) to the controller 16.

Also, the short-range communication unit 12 encodes data that is to be transmitted to a different NFC communication device (hereinafter referred to as transmission data), supplied from the controller 16, for example, into Manchester codes.

When communication is carried out in the active mode, or when communication is carried out in the passive mode and the NFC communication device 1 acts as the initiator, the short-range communication unit 12 causes a current to flow through the antenna 11 so that the antenna 11 is caused to emit a carrier wave (an electromagnetic wave thereof) having a predetermined single frequency. The short-range communication unit 12 modulates the carrier wave in the form of the current that flows through the antenna 11, according to signals obtained by encoding transmission data (hereinafter also referred to as encoded signals). Thus, an electromagnetic wave generated by modulating the carrier wave according to the transmission data is emitted.

When communication is carried out in the passive mode and the NFC communication device 1 acts as the target, the short-range communication unit 12 changes the impedance, as viewed from the outside, of the coil serving as the antenna 11 according to encoded signals. When an electromagnetic wave that serves as a carrier wave is has been generated by a different NFC communication device so that an RF field (magnetic field) has been formed around the antenna 11, in accordance with change in the impedance of the coil serving as the antenna 11, the RF field around the antenna 11 also changes. Thus, the carrier wave in the form of the electromagnetic wave output from a different NFC communication deice is modulated according to encoded signals, and transmission data is transmitted to the different NFC communication device outputting the electromagnetic wave.

The modulation scheme used in the short-range communication unit 12 may be, for example, amplitude shift keying (ASK). Without limitation to ASK, other modulation schemes may be used in the short-range communication unit 12, such as phase shift keying (PSK) or quadrature amplitude modulation (QAM). Also, the degree of modulation can be chosen as desired, without limitation to values such as 8% to 30%, 50%, or 100%.

The random-number generator 13 generates a random number, and supplies data representing the random number to the controller 16.

The input unit 14 includes buttons, switches, a microphone, etc. The input unit 14 is operated or receives input of speech when the user enters various instructions to the NFC communication device 1.

The controller 16 is formed, for example, by a processor such as a central processing unit (CPU) or a micro processor unit (MPU). By executing predetermined programs, the controller 16 controls the blocks of the NFC communication device 1 and executes predetermined processing according to instructions input by the user via the input unit 14 or reception data from other NFC communication devices. Also, the controller 16 supplies to the short-range communication unit 12 transmission data that is to be transmitted to other NFC communication devices.

FIG. 3 is a block diagram showing an example of the configuration of functions achieved by execution of predetermined programs by the controller 16. By execution of the predetermined programs by the controller 16, functions of a communication controller 31, an indication-mode setter 32, an indication controller 33, a key exchanger 34, an encryption/decryption unit 35, and a data processor 36.

The communication controller 31 controls the short-range communication unit 12 according to instructions input by the user via the input unit 14, etc. Also, the communication controller 31 supplies reception data from other NFC communication devices, supplied from the short-range communication unit 12, to the indication-mode setter 32, the indication controller 33, the key exchanger 34, or the encryption/decryption unit 35 as appropriate. Furthermore, the communication controller 31 obtains an encryption key from the key exchanger 34, and supplies the encryption key to the short-range communication unit 12. Also, the communication controller 31 obtains transmission data to other NFC communication devices from the encryption/decryption unit 35, and supplies the transmission data to the short-range communication unit 12.

When the NFC communication device 1 acts as the initiator, the indication-mode setter 32 sets an indication mode for the NFC communication device 1 acting as the initiator (hereinafter referred to as an initiator indication mode) and an indication mode for a different NFC communication device acting as the target (hereinafter referred to as a target indication mode) on the basis of the random number supplied from the random-number generator 13. The indication-mode setter 32 supplies data representing the initiator indication mode (hereinafter referred to as initiator-indication-mode data) to the indication controller 33. Also, the indication-mode setter 32 supplies data representing the target indication mode (hereinafter referred to as target-indication-mode data) to the communication controller 31.

The indication controller 33 obtains target-indication-mode data transmitted from a different NFC communication device from the encryption/decryption unit 35. The indication controller 33 controls the indicator 15 on the basis of the initiator-indication-mode data supplied from the indication-mode setter 32 or the target-indication-mode data transmitted from a different NFC communication device, thereby causing the indicator 15 that a secure communication path has been established with a different NFC communication device.

The key exchanger 34 exchanges keys with a different NFC communication device with which communication is carried out. More specifically, when the NFC communication device 1 acts as the initiator, the key exchanger 34 generates a pair of asymmetric encryption key and decryption key. The key exchanger 34 supplies the encryption key to the communication controller 31. The communication controller 31 obtains a session key encrypted using the encryption key (hereinafter referred to as an encrypted session key), transmitted from a different NFC communication device (target) with which communication is carried out. The key exchanger 34 decrypts the encrypted session key using the decryption key paired with the encryption key used to encrypt the session key, and supplies the session key obtained by the decryption to the encryption/decryption unit 35.

When the NFC communication device 1 acts as the target, the key exchanger 34 obtains from the communication controller 31 an encryption key transmitted from a different NFC communication device (initiator) with which communication is carried out. Also, the key exchanger 34 generates a session key on the basis of a random number generated by the random-number generator 13. Furthermore, the key exchanger 34 encrypts the session key using the encryption key transmitted from the initiator, and supplies the encrypted session key to the communication controller 31. Then, the key exchanger 34 supplies the encrypted session key to the encryption/decryption unit 35.

The encryption/decryption unit 35 obtains from the communication controller 31 reception data received from a different NFC communication device. The encryption/decryption unit 35 decrypts the reception data using the session key, and supplies the decrypted data to the data processor 36. Also, the encryption/decryption unit 35 obtains from the data processor 36 transmission data that is to be transmitted to a different NFC communication device. The encryption/decryption unit 35 encrypts the transmission data using the session key, and supplies the encrypted data to the communication controller 31.

The data processor 36 executes predetermined processing on the basis of the data supplied from the encryption/decryption unit 35. Also, the data processor 36 supplies transmission data that is to be transmitted to a different NFC communication device to the encryption/decryption unit 35.

Figure 4:
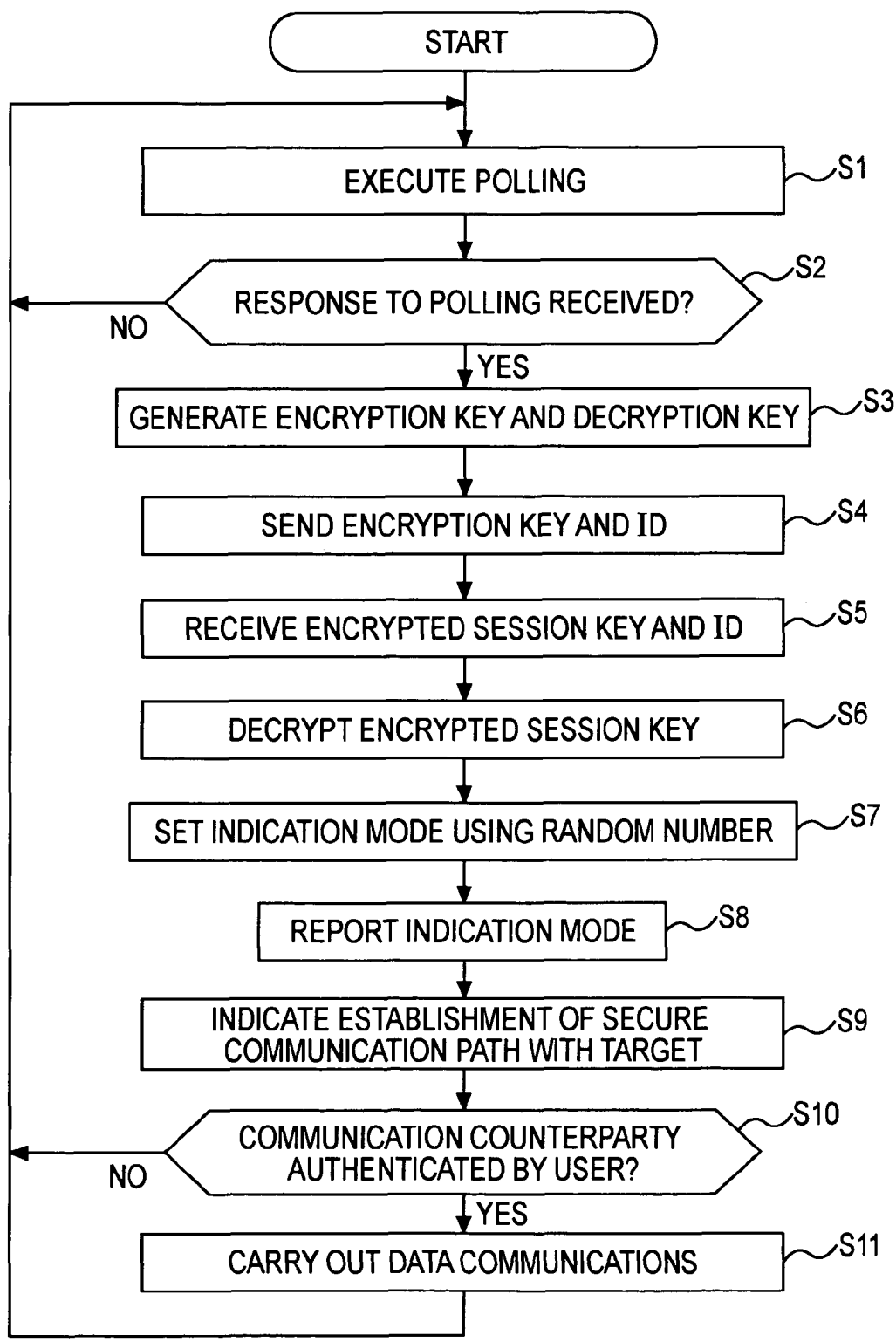
FIG. 4 is a flowchart of a process executed by an initiator.
Figure 5:
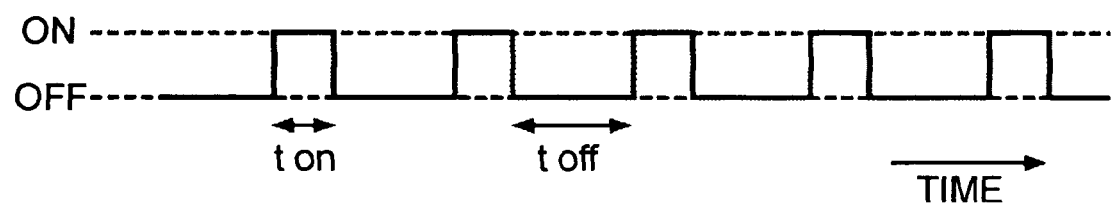
FIG. 5 is a diagram showing an example of blinking pattern of an LED.
Figure 6:
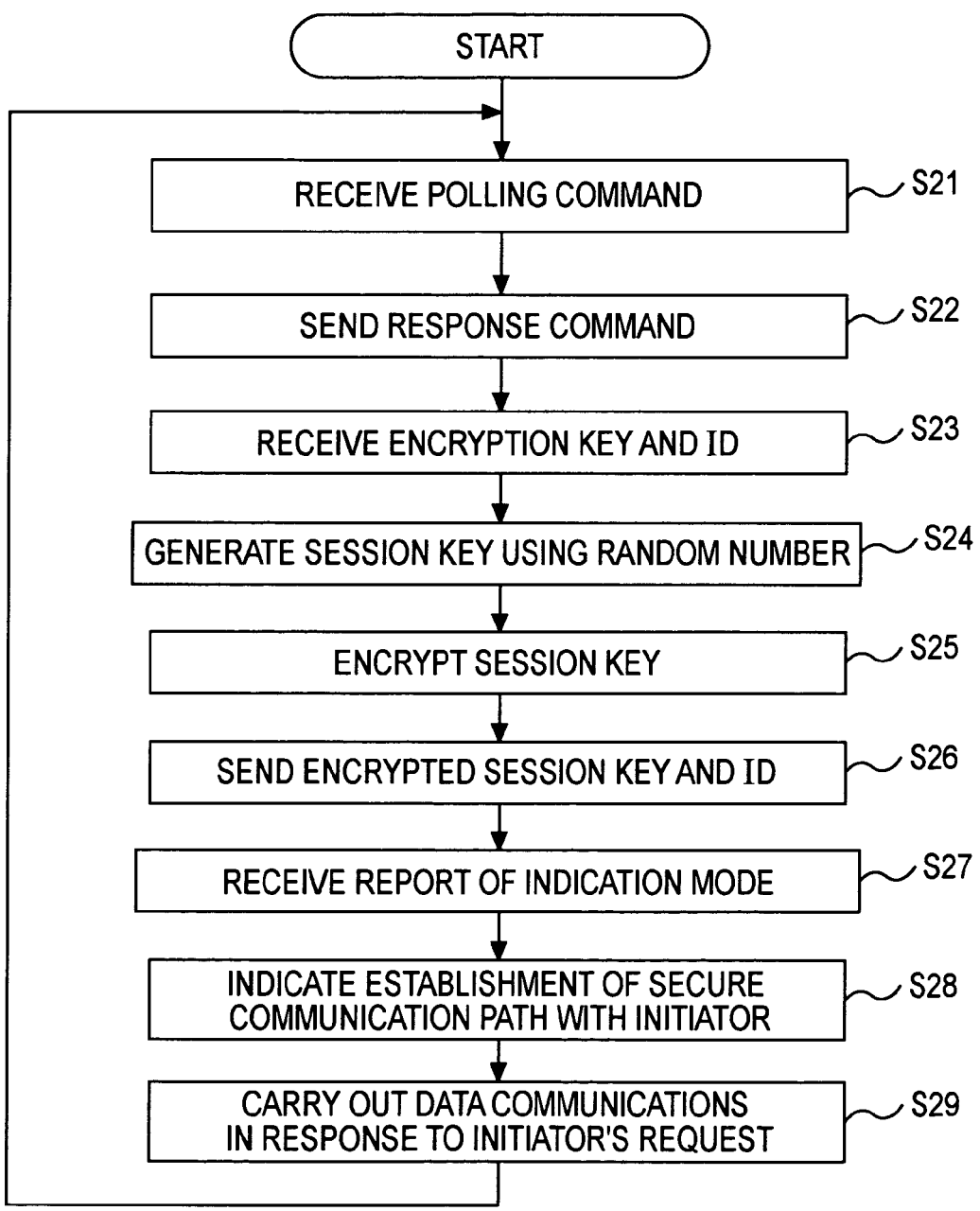
FIG. 6 is a flowchart of a process executed by a target.

Next, processing executed in the NFC communication device 1 will be described with reference to FIGS. 4 to 6. The following description will be given in the context of an example where the NFC communication device 1 acts as the initiator and the NFC communication device 2 acts as the target. Hereinafter, the NFC communication device 1 acting as the initiator will be simply referred to as the initiator and the NFC communication device 2 acting as the target will be simply referred to as the target.

First, a process executed by the NFC communication device 1 acting as the initiator will be described with reference to a flowchart shown in FIG. 4.

In step S1, the short-range communication unit 12 executes polling. More specifically, the short-range communication unit 12 sends polling commands at predetermined intervals via the antenna 11 under the control of the communication controller 31.

In step S2, the short-range communication unit 12 checks whether a polling response has been received. When it is determined in step S2 that a polling response has not been received, the process returns to step S1 and steps S1 and S2 are repeated until it is determined in step S2 that a polling response has been received.

When it is determined in step S2 that a polling response has been received, the process proceeds to step S3. More specifically, the process proceeds to step S3 when the target receives a polling signal in step S21 and sends a polling response command in step S22 and the short-range communication unit 12 of the initiator receives the response command, as will be described later with reference to FIG. 6.

In step S3, the key exchanger 34 generates an encryption key and a decryption key. More specifically, the key exchanger 34 generates a pair of asymmetric encryption key and decryption key based on a public-key cryptosystem such as the RSA (Rivest Shamir Adleman) cryptosystem, an elliptic-curve crypto system, or the ElGamal cryptosystem.

In step S4, the short-range communication unit 12 sends an encryption key and an ID. More specifically, the key exchanger.34 supplies the generated encryption key to the communication controller 31. The communication controller 31 supplies the encryption key and an ID that serves as identification information of the NFC communication device 1 acting as the initiator to the short-range communication unit 12. The short-range communication unit 12 sends the encryption key and the initiator ID to the target via the antenna 11.

As will be described later with reference to FIG. 6, the target receives the encryption key and the initiator ID in step S23, generates a session key in step S24, and sends to the initiator a session key encrypted using the encryption key transmitted from the initiator (an encrypted session key) and an ID that serves as identification information of the NFC communication device 2 acting as the target in step S26.

In step S5, the short-range communication unit 12 receives the encrypted session key and the ID transmitted from the target via the antenna 11.

In step S6, the key exchanger 34 decrypts the encrypted session key. More specifically, the NFC communication device 1 supplies the encrypted session key and the target ID to the communication controller 31. The communication controller 31 supplies the encrypted session key to the key exchanger 34 and the target ID to the indication controller 33. The key exchanger 34 decrypts the encrypted session key using the decryption key generated in step S3.

As will be described later with reference to FIG. 6, the session key obtained by the decryption is a shared key generated by the target using a random number. Furthermore, the encrypted session key is encrypted using the encryption key generated by the initiator, so that the encrypted session key can only be decrypted using the decryption key owned by the initiator. Furthermore, the session key remains effective only during the current communication session. Thus, the session key is owned only by the initiator and the target of the current communication session, so that data encrypted using the session key can only be decrypted by the initiator and the target. Therefore, a secure encrypted communication path is established between the target and the initiator.

In step S7, the indication-mode setter 32 sets an indication mode using a random number. More specifically, the input unit 14 supplies data representing a generated random number to the indication-mode setter 32. The indication-mode setter 32 sets an initiator indication mode and a target indication mode on the basis of the random number received.

In step S8, the indication-mode setter 32 reports the indication mode. More specifically, the indication-mode setter 32 supplies initiator-indication-mode data representing the initiator indication mode to the indication controller 33. Also, the indication-mode setter 32 supplies target-indication-mode data representing the target indication mode to the encryption/decryption unit 35. The encryption/decryption unit 35 encrypts the target-indication-mode data using the session key, and sends the encrypted target-indication-mode data to the target via the communication controller 31, the short-range communication unit 12, and the antenna 11.

The target receives the target-indication-mode data in step S27 described later with reference to FIG. 6.

In step S9, the indicator 15 indicates that a secure communication path has been established with the target. More specifically, under the control of the indication controller 33, the indicator 15 indicates that a secure communication path has been established with the target, in the indication mode represented by the initiator-indication-mode data. At this time, in step S28 described later with reference to FIG. 6, in cooperation with the initiator, the target also indicates that a secure communication path has been established with the initiator, in the indication mode represented by the target-indication-mode data transmitted from the initiator.

For example, when the indicator 15 is formed of a light emitting device such as a light emitting diode or a light bulb, by causing the indicator 15 of the initiator and the indicator 15 of the target to turn on or off in synchronization with each other, it is possible to indicate that a secure communication path has been established. In this case, for example, an LED ON period ton and an LED OFF period toff shown in FIG. 5 are set using a random number in step S7, and target-indication-mode data representing the ON period ton and the OFF period toff is transmitted from the initiator to the target in step S8. Instead of causing the LEDs to turn on and off in synchronization with each other, for example, the LEDs of the initiator and the target may be caused to turn on with the same color.

For example, the indicator 15 is formed of a display device, such as a liquid crystal display (LCD), it is possible to indicate that a secure communication path has been established by causing the indicator 15 of the initiator and the indicator 15 of the target to display the same moving image picture, sill picture, text, or the like. In this case, for example, content that is to be displayed is set on the basis of a random number in step S7, and target-indication-mode data representing the display content is transmitted from the initiator to the target in step S8.

Yet alternatively, for example, when the indicator 15 is formed of an audio output device, such as a speaker or an alarm, it is possible to indicate that a secure communication path has been established by causing the indicator 15 of the initiator and the indicator 15 of the target to output sound with the same melody, rhythm, pitch, tone, or period. In this case, for example, content of sound that is to be output is set on the basis of a random number in step S7, and target-indication-mode data representing the sound content is transmitted from the initiator to the target in step S8.

Still alternatively, when the indicator 15 is formed of a mobile device, such as a robot or a vibrator, it is possible to indicate that a secure communication path has been established by causing the indicator 15 of the initiator and the indicator 15 of the target to execute the same operation. For example, robots as the indicators 15 move in the same manner, or vibrators as the indicator 15 vibrate in the same pattern. In this case, for example, the operation of the indicators 15 is set on the basis of a random number in step S7, and target-indication-mode data representing the operation is transmitted from the initiator to the target in step S8.

As long as it is possible to recognize that the indication by the indicator 15 of the initiator and the indication by the indicator 15 of the target corresponds to each other (are associated with each other) and that the indicator 15 of the initiator and the indicator 15 of the target operate in cooperation with each other, the indication modes of the initiator and the target need not necessarily be the same. For example, when the indicators 15 are audio output devices, it is possible to form a consonance or a dissonance with a sound output from the initiator and a sound output from the target. Alternatively, for example, when the indicators 15 are display devices, the initiator and the target may display mutually corresponding images or display segments that together form a single meaningful word or sentence. Yet alternatively, for example, when the indicators 15 are mobile devices, the initiator and the target may perform mutually corresponding operations.

As the initiator-indication-mode data and the target-indication-mode data, data actually representing the manner of indication (e.g., blinking cycle or melody) may be set. Alternatively, it is possible to set in advance a plurality of indication modes in each NFC communication device and assign identification numbers identifying the indication modes so that identification numbers can be set on the basis of a random number.

Since the initiator and the target perform indication in mutually corresponding manners, the user can readily identify an NFC communication device with which a secure communication path has been established.

Furthermore, it is possible to cause the target to present information (e.g., ID, device name, or design) identifying the initiator (e.g., display an image or output a sound) and cause the initiator to present information (e.g., ID, device name, or design) identifying the target (e.g., display an image or output a sound) so that the user can identify the counterparty of communication more reliably.

In step S10, the communication controller 31 checks whether the counterparty of communication has been accepted by the user. More specifically, when indication by a desired NFC communication device (the NFC communication device 2 in this example) has been performed correspondingly to indication by the indicator 15 of the initiator, the user inputs data representing acceptance of the counterparty of communication via the input unit 14. When data representing acceptance of the counterparty of communication is obtained from the input unit 14, the communication controller 31 determines that the counterparty of communication has been accepted by the user. Then, the process proceeds to step S11.

In step S11, the short-range communication unit 12 carries out data communication, whereby data that the user wishes to actually exchange is exchanged between the initiator and the target. Since the data exchanged is encrypted using a session key, the security of the data is assured. At this time, the communication mode may be switched from short-range communication to a mode in which communication can be carried out at a longer distance so that data can be exchanged between remote locations.

When communication with the target has been finished, the process returns to step S1, and step S1 and the subsequent steps described above are executed.

When it is determined in step S10 that the counterparty of communication has not been accepted by the user, the process returns to step S1. For example, when indication by a desired NFC communication device has not been performed correspondingly to indication by the indicator 15 of the initiator, or when indication corresponding to indication by the indicator 15 of the initiator has been performed by an NFC communication device that is different from the desired NFC communication device, the user inputs data representing rejection of the counterparty of communication via the input unit 14. When data representing rejection of the counterparty of communication is obtained from the input unit 14, the communication controller 31 determines that the counterparty of communication has not been accepted by the user. Then, the process returns to step S1, and step S1 and the subsequent steps described above are executed. At this time, in order to carry out communication more quickly and reliably with a desired NFC communication device, the ID of the rejected NFC communication device may be stored so that an NFC communication device having an ID different from the stored ID will be detected from then on.

Next, a process executed by the target in association with the process executed by the initiator shown in FIG. 4 will be described with reference to a flowchart shown in FIG. 6.

In step S21, the short-range communication unit 12 of the target receives via the antenna 11 the polling command transmitted from the initiator in step S1 described earlier with reference to FIG. 4.

In step S22, the short-range communication unit 12 sends a response command to the initiator via the antenna 11.

In step S23, the short-range communication unit 12 receives the encryption key and the ID transmitted from the initiator in step S4 described earlier with reference to FIG. 4.

The short-range communication unit 12 supplies the encryption key and the initiator ID to the communication controller 31. The communication controller 31 supplies the encryption key to the key exchanger 34 and the initiator ID to the indication-mode setter 32.

In step S24, the key exchanger 34 generates a session key using a random number. More specifically, the random-number generator 13 generates a random number having a predetermined number of digits. The key exchanger 34 obtains data representing the random number from the random-number generator 13, and generates a session key using the random number as a bit pattern. Since the bit pattern of the session key is based on the random number as described above, third parties are prohibited from correctly guessing the bit pattern. The key exchanger 34 supplies the session key to the encryption/decryption unit 35.

In step S25, the key exchanger 34 encrypts the session key using the encryption key received from the initiator.

In step S26, the short-range communication unit 12 sends the encrypted session key and an ID. More specifically, the key exchanger 34 supplies the encrypted session key to the communication controller 31. The communication controller 31 supplies the encrypted session key and an ID that serves as identification information for identifying the NFC communication device 2 acting as the target to the short-range communication unit 12. The short-range communication unit 12 sends the encrypted session key and the target ID to the initiator via the antenna 11.

In step S27, the short-range communication unit 12 receives target-indication-mode data. More specifically, the short-range communication unit 12 receives via the antenna 11 the target-indication-mode data transmitted from the initiator in step S8 described earlier with reference to FIG. 4. The short-range communication unit 12 supplies the target-indication-mode data to the encryption/decryption unit 35 via the communication controller 31. The encryption/decryption unit 35 decrypts the target-indication-mode data using the session key. The encryption/decryption unit 35 supplies the decrypted target-indication-mode data to the indication controller 33.

Since the target-indication-mode data is encrypted using a session key owned only by the initiator and the target as described earlier, eavesdropping and tampering by third parties are prevented.

In step S28, the indication controller 33 indicates that a secure communication path has been established with the initiator. More specifically, under the control of the indication controller 33, the indicator 15 indicates that a secure communication path has been established with the initiator, in the indication mode represented by the target-indication-mode data.

In step S29, the short-range communication unit 12 carries out data communication in response to a request from the initiator. When the communication with the initiator has been finished, the process returns to step S21, and step S21 and the subsequent steps described above are executed.

Since it is possible to readily check a counterparty with which a secure communication path has been established before exchanging data as described above, secure communication can be carried out readily and reliably.

Figure 7:
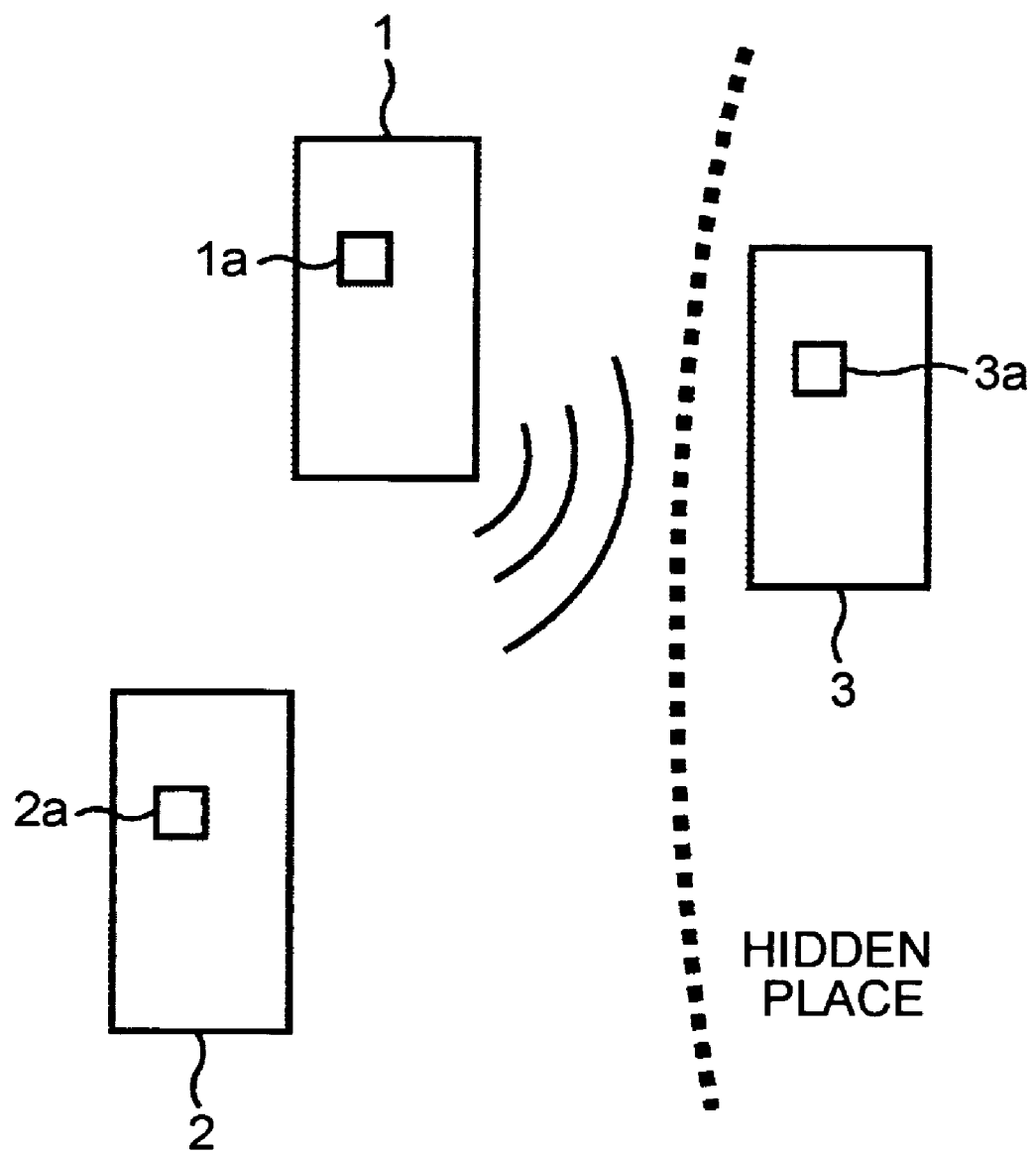
FIG. 7 is a diagram for explaining eavesdropping by a third party.

For example, referring to FIG. 7, when communication is to be carried out between the NFC communication device 1 as the initiator and the NFC communication device 2 as the target, even when a malicious third party attempts to intercept communication between the NFC communication device 1 and the NFC communication device 2 by the NFC communication device 3 disposed at a hidden place in the proximity of the NFC communication device 1, since indication corresponding to indication by the indicator 1a of the NFC communication device 1 is performed by the indicator 3a of the NFC communication device 3 instead of the indicator 2a of the NFC communication device 2, the user can readily and reliably recognize before exchanging data that the NFC communication device 1 is going to carry out communication with an unintended counterparty.

As another example, even when a communication device attempts to intercept communication between the NFC communication device 1 and the NFC communication device 2 using intense electromagnetic waves or using special techniques for detecting weak electromagnetic waves, similarly, since indication corresponding to indication by the indicator 1a of the NFC communication device 1 is not performed by the indicator 2a of the NFC communication device 2, the user can readily and reliably recognize before exchanging data that the NFC communication device 1 is going to carry out communication with an unintended counterparty.

Furthermore, since the indication modes are set using a random number for each communication session, a communication device of a third party is prohibited from spoofing as the target by performing indication corresponding to indication by the initiator.

Furthermore, since the target-indication-mode data is encrypted using a session key owned only by the initiator and the target, even if the target-indication-mode data is intercepted by an NFC communication device of a third party, the NFC communication device is prohibited from performing indication represented by the target-indication-mode data.

As described above, when a first communication device sets a first indication mode and a second indication mode associated with the first indication mode, sends data representing the second indication mode to a second communication device with which communication has been established, and indicates that communication has been established between the first communication device and the second communication device in the first indication mode correspondingly to indication in the second indication mode by the second communication device, and the second communication device receives the data representing the second indication mode, transmitted from the first communication device, and indicates that communication has been established between the first communication device and the second communication device in the second indication mode correspondingly to the indication in the first indication mode by the first communication device, it is possible to recognize that communication has been established with a different communication device. Furthermore, it is possible to readily identify a counterparty of communication, so that secure communication can be carried out readily and reliably.

When a first indication mode and a second indication mode corresponding to the first indication mode are set, transmission of data representing the second indication mode to a different communication device with which communication has been established is controlled, and it is indicated in the first indication mode that communication has been established between an own communication device and the different communication device correspondingly to indication in the second indication mode by the different communication device, it is possible to recognize that communication has been established with the different communication device. Furthermore, it is possible to readily identify a counterparty of communication, so that secure communication can be carried out readily and reliably.

When reception of data representing a second indication mode corresponding to a first indication mode, transmitted from a different communication device, is controlled, and it is indicated in the second indication mode that communication has been established between an own communication device and the different communication device correspondingly to indication in the first indication mode by the different communication device, it is possible to recognize that communication has been established with the different communication device. Furthermore, it is possible to readily identify a counterparty of communication, so that secure communication can be carried out readily and reliably.

Although the above description has been given in the context of an example where NFC is used as a protocol of short-range communication, it is possible to use communication protocols based on contactless IC card standards, such as ISO (International Organization for Standardization)/IEC (International Electrotechnical Commission) 14443 or Felica®, or communication protocols based on infrared communication standards, such as IrDA (Infrared Data Association).

Also, communication devices based on wireless communication standards, such as Bluetooth, Wireless LAN (Local Area Network), or Wireless USB (Universal Serial Bus), may carry out short-range communication by reducing electric power used for transmission and reception.

Furthermore, in order to verify the authenticity of the encryption key generated by the initiator, for example, a digital certificate based on an international standard such as X.509 may be transmitted using PKI (Public Key Infrastructure) technologies. Also, instead of generating an asymmetric pair of encryption key and decryption key, a symmetric pair of encryption key and decryption key may be generated.

The present invention can be applied to devices having functions of wireless communication, such as personal digital assistants (PDAs), personal computers (PCs), cellular phones, watches, or pens, as well as communication devices dedicated for wireless communication.

The series of processes described above can be executed by hardware or software. When the series of processes are executed by software, programs constituting the software is installed from a program recording medium onto a computer embedded in special hardware or onto a general-purpose personal computer or the like that is capable of executing various functions with various programs installed thereon.

Figure 8:
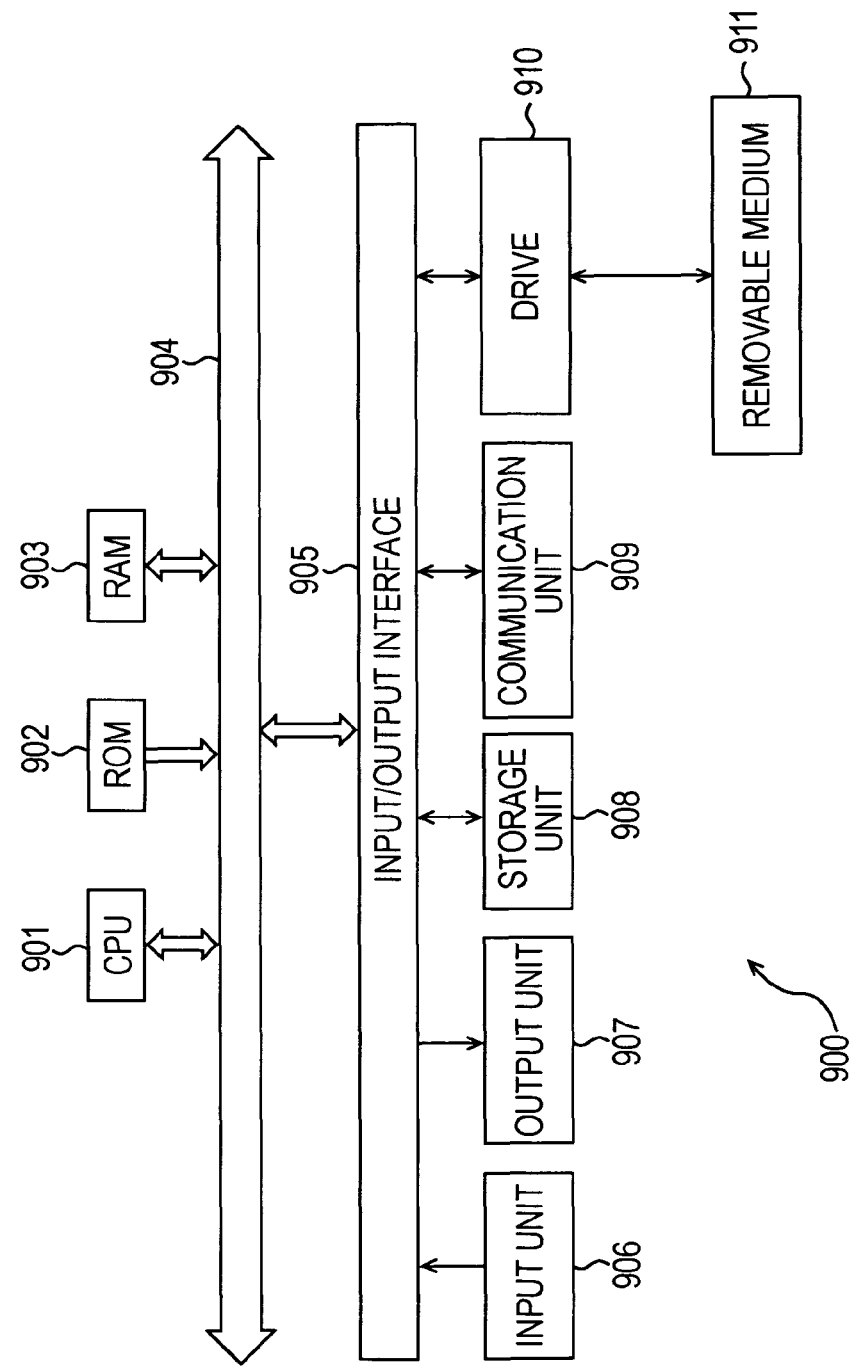
FIG. 8 is a block diagram showing an example of the configuration of a personal computer.

FIG. 8 is a block diagram showing an example of the configuration of a personal computer that executes the processes described above according to programs. A central processing unit (CPU) 901 executes various processes according to programs stored in a read-only memory (ROM) 902 or a recording-unit 908. A random access memory (RAM) 903 stores programs executed by the CPU 901, relevant data, etc. as needed. The CPU 901, the ROM 902, and the RAM 903 are connected to each other via a bus 904.

The CPU 901 is also connected to an input/output interface 905 via the bus 904. The input/output interface 905 is connected to an input unit 906 including a keyboard, a mouse, a microphone, etc., and to an output unit 907 including a display, a speaker, etc. The CPU 901 executes various processes according to instructions input from the input unit 906. The CPU 901 then outputs results of the processes to the output unit 907.

The recording unit 908 connected to the input/output interface 905 is formed of, for example, a hard disc, and it stores programs executed by the CPU 901 and various relevant data. A communication unit 909 carries out communication with external devices via networks, such as the Internet or local area networks.

Also, it is possible to obtain programs via the communication unit 909 and to store the programs in the recording unit 908.

Furthermore, a drive 910 is connected to the input/output interface 905. When a removable medium 911 such as a magnetic disc, an optical disc, a magneto-optical disc, or a semiconductor memory, is mounted on the drive 910, the drive 910 the removable medium 911 to obtain programs, data, etc. recorded thereon. The programs, data, etc. that have been obtained are transferred to and stored in the recording unit 908 as needed.

As shown in FIG. 8, the program recording medium for storing programs that are installed onto a computer for execution by the computer may be the removable medium 911, which is a package medium such as a magnetic disc (e.g., a flexible disc), an optical disk (e.g., a CD-ROM (compact disc read-only memory) or a DVD (digital versatile disc)), a magneto-optical disk, or a semiconductor memory, or the ROM 902 or the hard disc of the recording unit 908 temporarily or permanently storing the programs. The programs can be stored on the program recording medium as needed via the communication unit 909, which is an interface such as a router, modem, etc., using wired or wireless communication medium, such as a local area network, the Internet, or digital satellite broadcasting.

It is to be understood that steps defining the programs stored on the program recording medium may include processes that are executed in parallel or individually, as well as processes that are executed in the orders described in this specification.

In this specification, a system refers to the entirety of a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
 a first communication device configured to carry out wireless communication; and
 a second communication device configured to carry out wireless communication;
 wherein the first communication device includes
 a setting means for setting the first device in an initiator indication mode or a target indication mode, the target indication mode being set in response to another device being set to the initiator indication mode,
 sending means for sending data assigning the target indication mode to the second communication device when communication has been established with the second communication device, and
 a first indicating means for indicating the establishment of communication between the first communication device and the second communication device and that the first device is in the initiator indication mode, and
 wherein the second communication device includes
 a receiving means for receiving the data assigning the target indication mode to the second communication device, the data having been sent from the first communication device, and
 a second indicating means for indicating the establishment of communication between the first communication device and the second communication device, and the assignment of the target indication mode to the second communication device.

2. The communication system of claim 1, wherein the first communication device and the second communication device are configured to carry out wireless communication using near field communication using electromagnetic induction.

3. The communication system of claim 1, wherein the first communication device outputs an electromagnetic wave when sending data and the second communication device load-modulates the electromagnetic wave output by the first device.

4. A notification method in a communication system including a first communication device and a second communication device that carry out wireless communication, the notification method comprising the steps of:
 setting an indication mode in the first communication device to an initiator indication mode or a target indication mode, the target indication mode being set in response to another device being set to the initiator indication mode;
 sending data assigning the target indication mode to the second communication device, from the first communication device, when communication has been established with the second communication device;
 indicating, at the first communication device, the establishment of communication between the first communication device and the second communication device in the first indication mode and that the first device is in the initiator indication mode;
 receiving the data assigning the target indication mode to the second communication device at the second communication device, the data having been sent from the first communication device; and
 indicating, at the second communication device, the establishment of communication between the first communication device and the second communication device, and the assignment of the target indication mode to the second communication.

5. A first communication device that carries out wireless communication with a second communication device, the communication device comprising:
 a setting means for setting the first device to an initiator indication mode or a target indication mode, the target indication mode being set in response to another device being set to the initiator indication mode;
 a communication means for sending data assigning the target indication mode to the second communication device when communication has been established with the different communication device;
 an indicating means for indicating the establishment of communication between the first communication device and the second communication device, and that the first device is in the initiator indication mode; and
 key exchanging means for securely exchanging a communication key with the second communication device,
 wherein the communication means sends the data assigning the target indication mode to the second communication device in an encrypted form using the communication key, after securely exchanging the communication key.

6. The communication device according to claim 5,
 wherein the communication means carries out short-range communication in which communication with the second communication device is started when the second communication device is placed in a proximity of the first communication device, and
 wherein the setting means sets the initiator indication mode and the target indication mode using a random number.

7. A first communication device that carries out wireless communication with a second communication device, the communication device comprising:
- a setting means for setting the first device to an initiator indication mode or a target indication mode, the target indication mode being set in response to another device being set to the initiator indication mode:
- a communication means for sending data assigning the target indication mode to the second communication device when communication has been established with the different communication device;
- an indicating means for indicating the establishment of communication between the first communication device and the second communication device, and that the first device is in the initiator indication mode: and
- wherein the communication means further sends a first identification information identifying the first communication device to the second communication device and receives second identification information identifying the second communication device,
- wherein the indicating means further indicates the second communication device using the second identification information; and
- wherein the communication means continues or stops communication with the second communication device according to an instruction input by a user after the second communication device has been identified, on the basis of the indication by the indicating means and the indication by the second communication device.

8. A first communication device that carries out wireless communication with a second communication device, the communication device comprising:
- a setting means for setting the first device to an initiator indication mode or a target indication mode, the target indication mode being set in response to another device being set to the initiator indication mode;
- a communication means for sending data assigning the target indication mode to the second communication device when communication has been established with the different communication device;
- an indicating means for indicating the establishment of communication between the first communication device and the second communication device, and that the first device is in the initiator indication mode; and
- wherein the indicating means includes a display, and the display indicates the establishment of communication between the first communication device and the second communication device by displaying an image or text that is the same as or that corresponds to an image or text displayed by the second communication device.

9. A first communication device that carries out wireless communication with a second communication device, the communication device comprising:
- a setting means for setting the first device to an initiator indication mode or a target indication mode, the target indication mode being set in response to another device being set to the initiator indication mode;
- a communication means for sending data assigning the target indication mode to the second communication device when communication has been established with the different communication device; and
- an indicating means for indicating the establishment of communication between the first communication device and the second communication device, and that the first device is in the initiator indication mode,
- wherein the indication means includes a light emitting device, and the light emitting device indicates the establishment of communication between the first communication device and the second communication device by emitting light with a color that is the same as or that corresponds to a color of light emitted by the different communication device, or by blinking at a cycle that is the same or that corresponds to a cycle of blinking on the second communication device.

10. A first communication device that carries out wireless communication with a second communication device, the communication device comprising:
- a setting means for setting the first device to an initiator indication mode or a target indication mode, the target indication mode being set in response to another device being set to the initiator indication mode;
- a communication means for sending data assigning the target indication mode to the second communication device when communication has been established with the different communication device; and
- an indicating means for indicating the establishment of communication between the first communication device and the second communication device, and that the first device is in the initiator indication mode,
- wherein the indicating means includes an audio output device, and the audio output device indicates the establishment of communication between the first communication device and the second communication device by outputting a sound that is the same or that corresponds to a sound output by the different communication device.

11. A notification method for a first communication device that carries out wireless communication with a second communication device, the notification method comprising:
- setting the first communication device to an initiator indication mode or a target indication mode, the target indication mode being set in response to the second communication device being set to the initiator indication mode and the first communication device receiving data assigning the target indication mode from the second communication device;
- sending data assigning the target indication mode to the second communication device, when communication has been established with the second communication device and the first communication device is set to the initiator indication mode; and
- indicating the establishment of communication between the first communication device and the second communication device and that the first communication device is in the initiator indication mode or in the target indication mode.

12. A non-transitory computer-readable-medium having stored thereon a computer program, for making a computer in a first communication device wirelessly communicate with a second communication device by performing operations comprising:
- setting the first communication device to initiator indication mode or a target indication mode, the target indication mode being set in response to the second communication device being set to the initiator indication mode and the computer program product receiving data sent from the second communication device assigning the target indication mode;
- sending data assigning the target indication mode to the second communication device, when communication has been established with the second communication device and the first communication device is set to the initiator indication mode; and
- indicating the establishment of communication between the first communication device and the second communication device and that the first communication device is in the initiator indication mode or that the first communication device is in the target indication mode.

13. A first communication device that carries out wireless communication with a second communication device, the first communication device comprising:
a communication means for receiving data assigning the first communication device to a target indication mode corresponding to a initiator indication mode to which the second communication device is set or for sending data assigning the target indication mode to the second communication device when communication has been established with the different communication device:
a setting means for setting the first communication device to an initiator indication mode or a target indication mode, the target indication mode being set in response to the communication means receiving data assigning the target indication mode to the first communication device; and
an indicating means for indicating establishment of communication between the first communication device and the second communication device and that the first communication device is in the target indication mode or that the first communication device is in the initiator indication mode,
wherein the communication means further sends a first identification information identifying the first communication device to the second communication device and receives second identification information identifying the second communication device, and
wherein the indicating means further indicates the second identification information.

14. A communication system comprising:
a first communication device configured to carry out wireless communication; and
a second communication device configured to carry out wireless communication;
wherein the first communication device includes
a setter configured to set the first device to an initiator indication mode or a target indication mode, the target indication mode being set in response to another device being set to the initiator indication mode,
a sender configured to send data assigning the target indication mode to the second communication device when communication has been established with the second communication device, and
a first indicator configured to indicate the establishment of communication between the first communication device and the second communication device and that the first device is in the initiator indication mode, and
wherein the second communication device includes
a receiver configured to receive the data assigning the target indication mode to the second communication device, the data having been sent from the first communication device, and
a second indicator configured to indicate the establishment of communication between the first communication device and the second communication device, and the assignment of the target indication mode.

15. A first communication device that carries out wireless communication with a second communication device, the communication device comprising:
a setter configured to set the first communication device to an initiator indication mode or a target indication mode, the target indication mode being set in response to the second communication device being set to the initiator indication mode and the first communication device receiving data assigning the target indication mode from the second communication device;
a communication unit configured to send data assigning the target indication mode to the second communication device or receive data assigning the target indication mode to the first communication device from the second communication device when communication has been established with the second communication device; and
an indicator configured to indicate the establishment of communication between the first communication device and the second communication device and that the first communication device is in the initiator indication mode or that the first communication device is in the target indication mode.

* * * * *